(12) United States Patent
Kashihara

(10) Patent No.: US 8,598,765 B2
(45) Date of Patent: Dec. 3, 2013

(54) DYNAMOELECTRIC MACHINE

(75) Inventor: Toshiaki Kashihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 340 days.

(21) Appl. No.: 12/984,966

(22) Filed: Jan. 5, 2011

(65) Prior Publication Data

US 2011/0260571 A1     Oct. 27, 2011

(30) Foreign Application Priority Data

Apr. 27, 2010 (JP) ................................. 2010-102259

(51) Int. Cl.
*H02K 3/28* (2006.01)
(52) U.S. Cl.
USPC ......................................................... 310/207
(58) Field of Classification Search
USPC .................. 310/180, 185, 201, 207
See application file for complete search history.

(56) References Cited

U.S. PATENT DOCUMENTS

| | | | | |
|---|---|---|---|---|
| 6,268,678 B1 * | 7/2001 | Asao et al. | ................. | 310/201 |
| 6,326,715 B1 * | 12/2001 | Asao et al. | ................. | 310/180 |
| 6,348,750 B1 * | 2/2002 | Taji et al. | ................. | 310/184 |
| 6,614,141 B2 | 9/2003 | Oohashi et al. | | |
| 6,657,352 B1 * | 12/2003 | Asao et al. | ................. | 310/180 |
| 8,174,159 B2 * | 5/2012 | Xu et al. | ................. | 310/198 |
| 2002/0079772 A1 * | 6/2002 | Oohashi et al. | ................. | 310/184 |
| 2006/0220488 A1 * | 10/2006 | Koike et al. | ................. | 310/179 |
| 2010/0013342 A1 * | 1/2010 | Xu et al. | ................. | 310/198 |
| 2011/0109178 A1 * | 5/2011 | Okamoto et al. | ................. | 310/71 |

FOREIGN PATENT DOCUMENTS

| | | |
|---|---|---|
| JP | 05-227688 A | 9/1993 |
| JP | 2002-136017 A | 5/2002 |
| JP | 3484412 B2 | 10/2003 |

OTHER PUBLICATIONS

Japanese Office Action issued in corresponding Japanese Application No. 2010-102259, dated Feb. 7, 2012.

* cited by examiner

*Primary Examiner* — Tran Nguyen
(74) *Attorney, Agent, or Firm* — Sughrue Mion, PLLC

(57) ABSTRACT

A U phase winding, an X phase winding, a V phase winding, a Y phase winding, a W phase winding, and a Z phase winding are configured by mounting conductor wires so as to alternate repeatedly between $5\pi/6$ short-pitch windings and $7\pi/6$ long-pitch windings, and are mounted into the stator core in that order so as to be stacked sequentially in a radial direction so as to be offset by one slot each in a first circumferential direction.

4 Claims, 8 Drawing Sheets

DYNAMOELECTRIC MACHINE

BACKGROUND OF THE INVENTION

1. Field of the Invention

The present invention relates to a dynamoelectric machine such as an automotive alternator, etc., and particularly relates to a stator winding mounting construction for a stator core in which slots are formed at a ratio of two slots per phase per pole.

2. Description of the Related Art

Conventional automotive alternators have included a stator that is formed by mounting a stator winding into a cylindrical stator core in which slots that extend axially are formed at a uniform angular pitch circumferentially; and a rotor that is disposed on an inner peripheral side of the stator, and that has a field coil. It is known that by forming the slots at a ratio of two slots per phase per pole, occurrences of surges in magnetic flux can be suppressed, fluctuations in generated voltage and output waveform disturbances can be reduced, and ripples can also be reduced when the alternating-current output from the stator is rectified into direct current.

Conventionally, from the viewpoint of stator productivity improvements and price reductions when mounting a stator winding into a stator core in which slots are formed at a ratio of two slots per phase per pole, methods have been proposed in which star-shaped winding units are prepared by forming into star shapes winding units that have been prepared by winding conductor wires into annular shapes, and the star-shaped winding units are mounted into the stator core in multiple layers (see Patent Literature 1, for example). In conventional automotive alternators such as that described in Patent Literature 1, star-shaped winding units that constitute six phase windings in two three-phase alternating-current windings are mounted into the stator core so as to be stacked in six layers radially so as to allow for balance in radial positions of coil ends to suppress power generation failure and declines in output.

Patent Literature 1: Japanese Patent No. 3484412 (Gazette)

However, in conventional automotive alternators such as that described in Patent Literature 1, because the coil ends of the six phase windings line up in six layers radially, radially outer coil ends are less likely to be exposed to cooling airflows, and winding temperature increases in the radially outer windings. Thus, winding resistance in each of the phase windings differs, giving rise to phase voltage differences, and one problem has been that fifth order and seventh order harmonic components are not canceled out completely, giving rise to magnetic noise.

SUMMARY OF THE INVENTION

The present invention aims to solve the above problems and an object of the present invention is to provide a dynamoelectric machine that can reduce magnetic noise due to fifth order and seventh order harmonic components by mounting respective phase windings so as to alternate repeatedly between short-pitch windings and long-pitch windings to reduce fifth order and seventh order harmonic components.

In order to achieve the above object, according to one aspect of the present invention, there is provided a dynamoelectric machine including: a rotor that is rotatably supported by a housing; and a stator including: a stator core in which slots are formed at a ratio of two slots per phase per pole; and a stator winding that is constituted by six phase windings that are mounted into wave windings in the stator core, the stator being supported by the housing so as to surround the rotor. The dynamoelectric machine is characterized in that: the six phase windings are mounted into the stator core so as to be stacked sequentially in a radial direction so as to be offset by one slot each in a first circumferential direction; and each of the six phase windings is configured such that a conductor wire is mounted so as to alternate repeatedly between a $5\pi/6$ short-pitch winding and a $7\pi/6$ long-pitch winding.

According to the present invention, because each of the six phase windings is configured such that a conductor wire is mounted so as to alternate repeatedly between a $5\pi/6$ short-pitch winding and a $7\pi/6$ long-pitch winding, fifth order harmonic components and seventh order harmonic components that are predominant among harmonic components can be reduced. Thus, even if winding temperature in the phase windings differs, and phase voltage differences arise, increases in magnetic noise that result from differences between the fifth order harmonic components and the seventh order harmonic components can be suppressed.

DETAILED DESCRIPTION OF THE PREFERRED EMBODIMENTS

Preferred embodiments of the dynamoelectric machine according to the present invention will now be explained with reference to the drawings.

Embodiment 1

Figure 1:
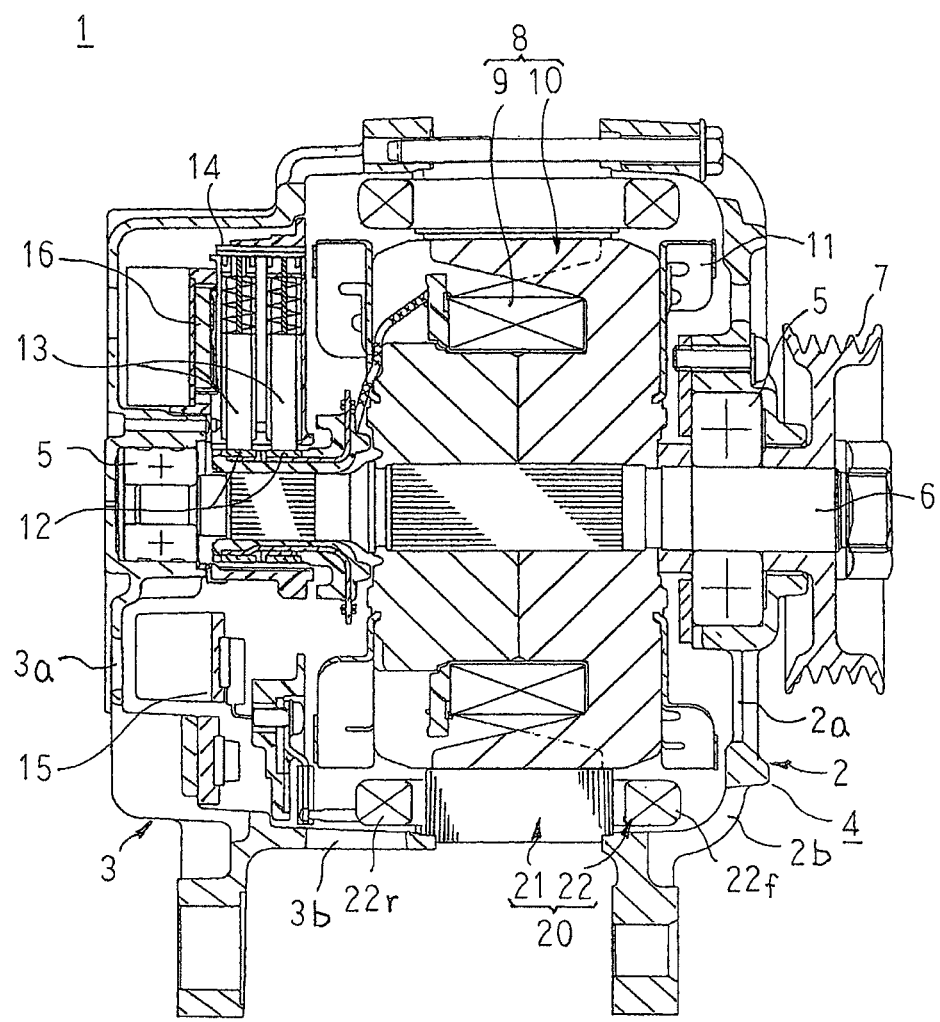
FIG. 1 is a longitudinal section of an automotive alternator according to Embodiment 1 of the present invention.
Figure 2:
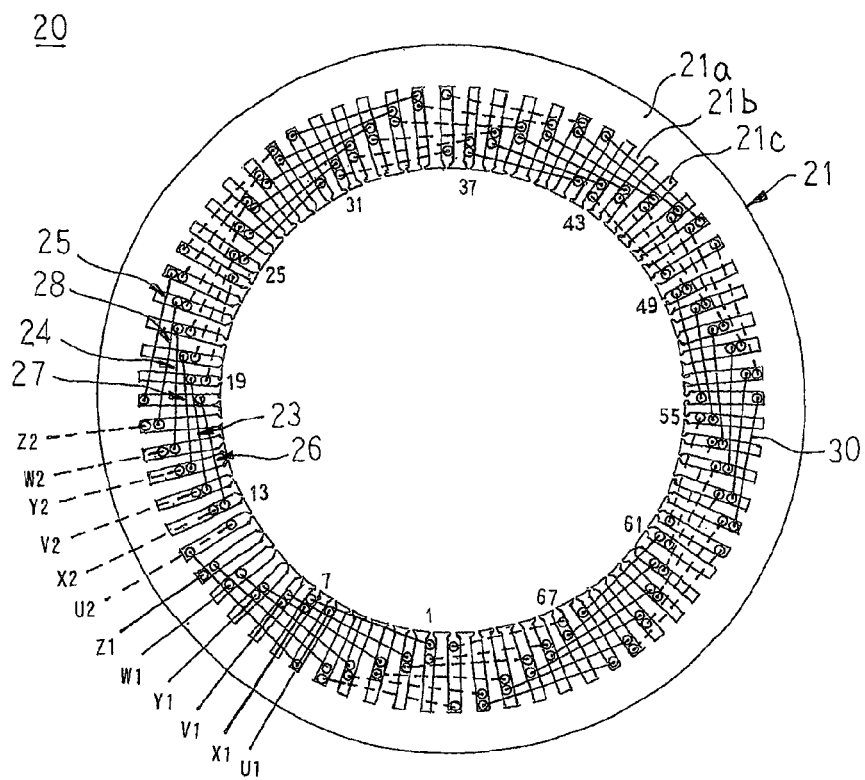
FIG. 2 is a rear-end end elevation that schematically shows an installed state of a stator winding in a stator that can be used in the automotive alternator according to Embodiment 1 of the present invention.
Figure 3:
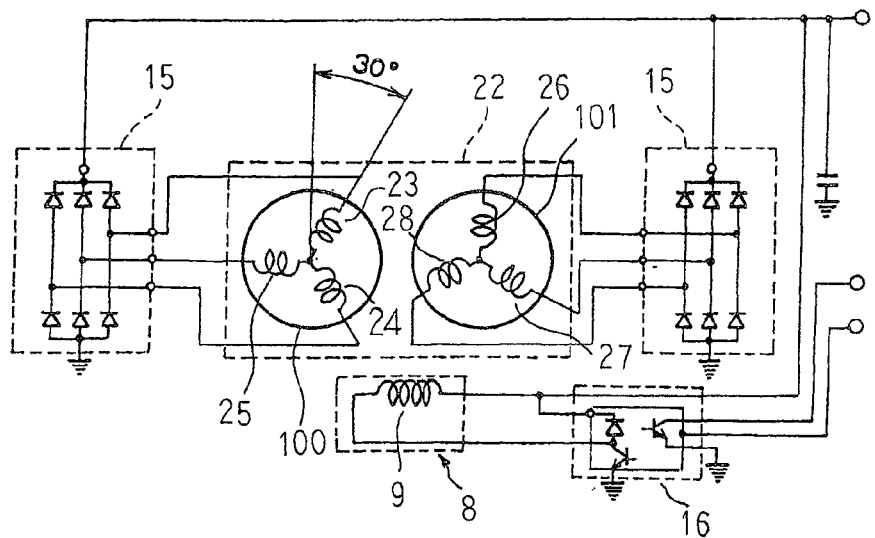
FIG. 3 is an electrical circuit diagram of the automotive alternator according to Embodiment 1 of the present invention.
Figure 4:
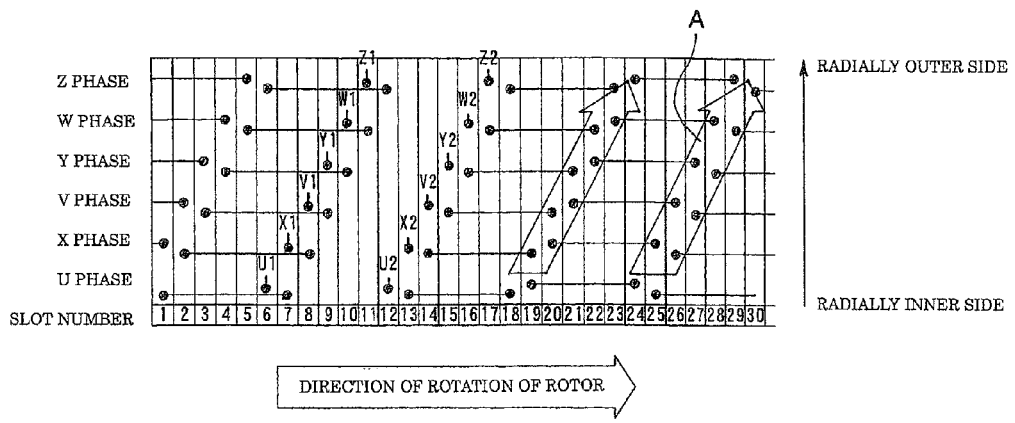
FIG. 4 is a developed projection that explains the installed state of the stator winding in the stator that can be used in the automotive alternator according to Embodiment 1 of the present invention.
Figure 5:
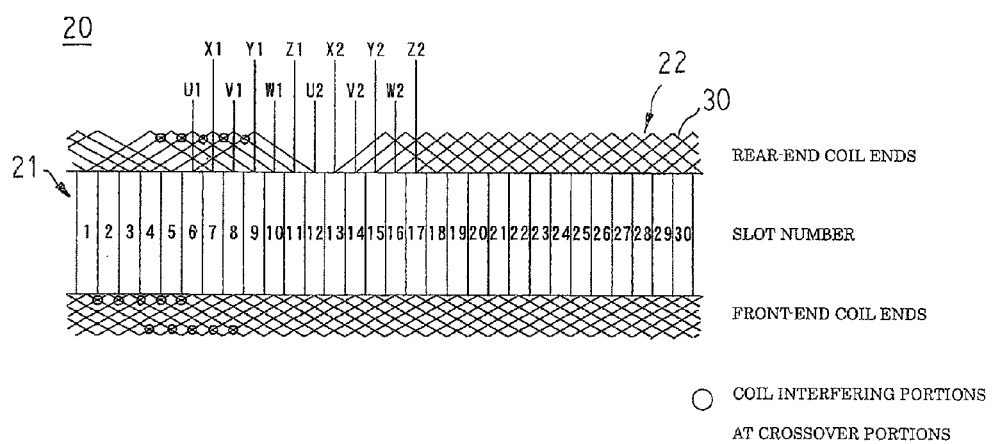
FIG. 5 is a developed projection that explains the installed state of the stator winding in the stator that can be used in the automotive alternator according to Embodiment 1 of the present invention.
Figure 6:
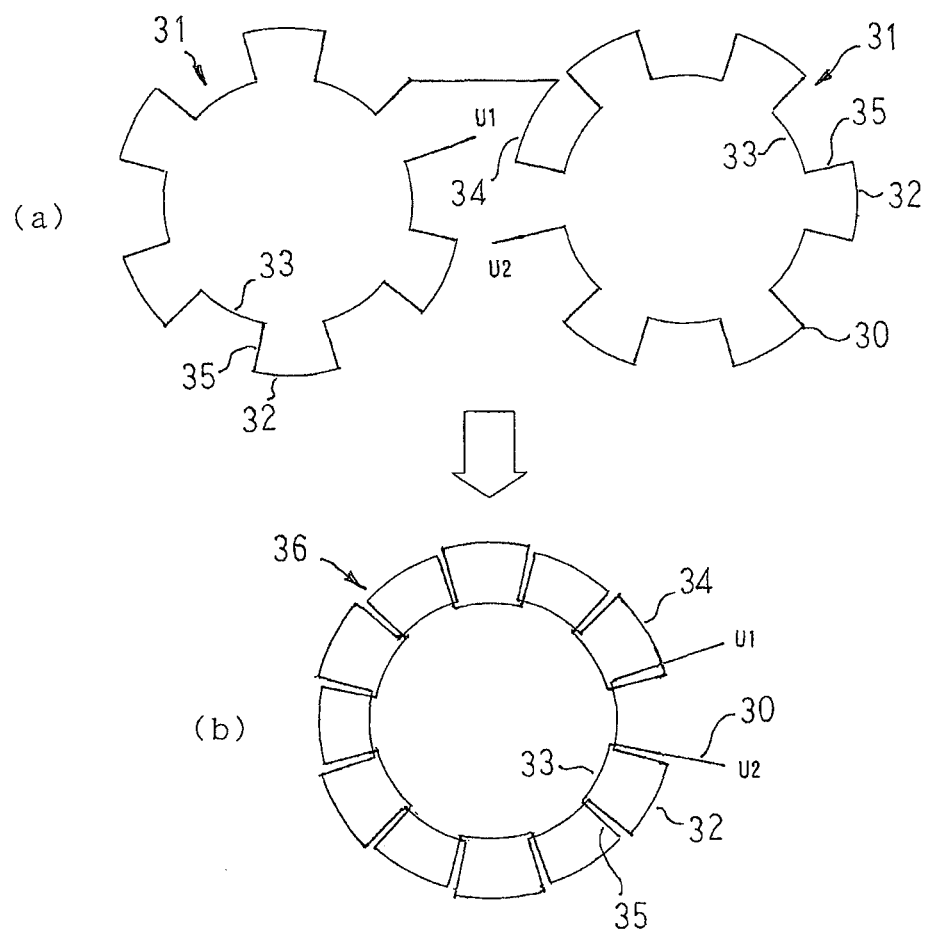
FIG. 6 is a diagram that explains a method for mounting the stator winding in the automotive alternator according to Embodiment 1 of the present invention.

FIG. 1 is a longitudinal section of an automotive alternator according to Embodiment 1 of the present invention, FIG. 2 is a rear-end end elevation that schematically shows an installed state of a stator winding in a stator that can be used in the automotive alternator according to Embodiment 1 of the present invention, and FIG. 3 is an electrical circuit diagram of the automotive alternator according to Embodiment 1 of the present invention. FIGS. 4 and 5 are each developed projections that explain the installed state of the stator winding in the stator that can be used in the automotive alternator according to Embodiment 1 of the present invention, FIG. 4 representing as a plan a state when the stator is viewed from axially outside, and FIG. 5 representing as a plan a state when the stator is viewed from radially inside. FIG. 6 is a diagram that explains a method for mounting the stator winding in the automotive alternator according to Embodiment 1 of the present invention. Moreover, solid lines in FIG. 2 represent crossover portions of conductor wires that are wound clockwise, and broken lines are crossover portions of conductor wires that are wound counterclockwise.

In FIG. 1, an automotive alternator 1 that functions as a dynamoelectric machine includes: a housing 4 that is constituted by a front bracket 2 and a rear bracket 3 that are each approximately bowl-shaped and made of aluminum; a shaft 6 that is rotatably supported in the housing 4 by means of bearings 5; a pulley 7 that is fixed to an end portion of the shaft 6 that extends out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a rear end of the shaft 6, and that supply electric current to the rotor 8; a pair of brushes 13 that slide on respective surfaces of the slip rings 12; a brush holder 14 that accommodates the brushes 13; rectifiers 15 that are electrically connected to the stator 20 so as to convert alternating current that is generated by the stator 20 into the direct current; and a voltage regulator 16 that is mounted onto the brush holder 14, and that adjusts magnitude of an alternating-current voltage that is generated by the stator 20.

A plurality of air intake apertures 2a are formed on an axial end surface of the front bracket 2 so as to face a front-end end surface of the rotor 8, and a plurality of air discharge apertures 2b are formed on a peripheral surface of the front bracket 2 so as to be positioned radially outside front-end coil ends 22f of a stator winding 22. Similarly, a plurality of air intake apertures 3a are formed on an axial end surface of the rear bracket 3 so as to face the rectifiers 15 and the voltage regulator 16, and a plurality of air discharge apertures 3b are formed on a peripheral surface of the rear bracket 3 so as to be positioned radially outside rear-end coil ends 22r of the stator winding 22.

The rotor 8 includes: a field coil 9 that generates magnetic flux on passage of an excitation current; a pole core 10 that is disposed so as to cover the field coil 9, and in which magnetic poles are formed by the magnetic flux; and the shaft 6, which is fitted centrally through the pole core 10. Fans 11 are fixed to two axial end surfaces of the pole core 10 by welding, etc.

The stator 30 is held from two axial ends by the front bracket 2 and the rear bracket 3, and includes: a stator core 21 that is disposed so as to surround the pole core 10 so as to ensure a uniform gap from an outer peripheral surface of the pole core 10 of the rotor 8; and the stator winding 22, which is mounted to the stator core 21.

Next, a construction of the stator 20 will be explained with reference to FIGS. 2, 4, and 5. Moreover, 1, 7, etc., through 67 in FIG. 2 represent slot numbers.

The stator core 21 is a laminated core that is prepared into a cylindrical shape by laminating predetermined number of core segments that are prepared by punching thin magnetic steel plates into annular shapes, and integrating the laminated predetermined number of core segments by welding, for example. The stator core 21 has: an annular core back portion 21a; tooth portions 21b that each extend radially inward from an inner peripheral surface of the core back portion 21a, and that are arranged at a uniform angular pitch circumferentially; slots 21c that are bounded by the core back portion 21a and adjacent tooth portions 21b; and flange portions 21d that extend in two circumferential directions from tip end portions of the tooth portions 21b. The tooth portions 21b are prepared so as to have tapered shapes in which respective circumferential widths gradually become narrower radially inward, and the slots 21c are formed so as to have rectangular cross-sections.

Here, the number of claw-shaped magnetic poles in the pole core 10 of the rotor 8 is twelve, and the number of slots 21c is seventy-two. Specifically, the slots 21c are formed at a ratio of two slots per phase per pole, and at a uniform angular pitch circumferentially (a pitch corresponding to an electrical angle of $\pi/6$).

The stator winding 22 has six phase windings that include an X phase winding 23, a Y phase winding 24, a Z phase winding 25, a U phase winding 26, a V phase winding 27, and a W phase winding 28 that are each prepared by winding one conductor wire 30 into the stator core 21. Here, the conductor wires 30 are continuous wires that are constituted by a copper wire that has been coated with an insulator.

The X phase winding 23 is configured by mounting a conductor wire 30 into a wave winding so as to enter the slots 21c at Slot Number 7 from the rear end, extend out frontward from the slots 21c at Slot Number 7, extend over a front-end end surface of the stator core 21 in a first circumferential direction, enter the slots 21c at Slot Number 14, extend out rearward from the slots 21c at Slot Number 14, extend over a rear-end end surface of the stator core 21 in the first circumferential direction, enter the slots 21c at Slot Number 19, and thereafter the conductor wire 30 sequentially enters the slots 21c at Slot Numbers 26, 31, 38, 43, 50, 55, 62, 67, and 2, and then mounting the conductor wire 30 into a wave winding such that the conductor wire 30 that projects out rearward from the slots 21c at Slot Number 2 extends over the rear-end end surface of the stator core 21 in the first circumferential direction, enters the slots 21c at Slot Number 8, extends out frontward from the slots 21c at Slot Number 8, extends over the front-end end surface of the stator core 21 in the second circumferential direction, enters the slots 21c at Slot Number 1, and thereafter sequentially enters the slots 21c at Slot Numbers 68, 61, 56, 49, 44, 37, 32, 25, 20, and 13.

The X phase winding 23 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end X1 is led out rearward from the slots 21c at Slot Number 7, and a winding finishing end X2 is led out rearward from the slots 21c at Slot Number 13. This X phase winding 23 is a two-turn wave winding that is mounted to the stator core 21 so as to alternate repeatedly between a 5π/6 short-pitch winding and a 7π/6 long-pitch winding.

The Y phase winding 24 is configured by mounting a conductor wire 30 into a wave winding so as to enter the slots 21c at Slot Number 9 from the rear end, extend out frontward from the slots 21c at Slot Number 9, extend over a front-end end surface of the stator core 21 in a first circumferential direction, enter the slots 21c at Slot Number 16, extend out rearward from the slots 21c at Slot Number 16, extend over a rear-end end surface of the stator core 21 in the first circumferential direction, enter the slots 21c at Slot Number 21, and thereafter the conductor wire 30 sequentially enters the slots 21c at Slot Numbers 28, 33, 40, 45, 52, 57, 64, 69, and 4, and then mounting the conductor wire 30 into a wave winding such that the conductor wire 30 that projects out rearward from the slots 21c at Slot Number 4 extends over the rear-end end surface of the stator core 21 in the first circumferential direction, enters the slots 21c at Slot Number 10, extends out frontward from the slots 21c at Slot Number 10, extends over the front-end end surface of the stator core 21 in the second circumferential direction, enters the slots 21c at Slot Number 3, and thereafter sequentially enters the slots 21c at Slot Numbers 70, 63, 58, 51, 46, 39, 34, 27, 22, and 15.

The Y phase winding 24 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end Y1 is led out rearward from the slots 21c at Slot Number 9, and a winding finishing end Y2 is led out rearward from the slots 21c at Slot Number 15. This Y phase winding 24 is a two-turn wave winding that is mounted to the stator core 21 so as to alternate repeatedly between a 5π/6 short-pitch winding and a 7π/6 long-pitch winding.

The Z phase winding 25 is configured by mounting a conductor wire 30 into a wave winding so as to enter the slots 21c at Slot Number 11 from the rear end, extend out frontward from the slots 21c at Slot Number 11, extend over a front-end end surface of the stator core 21 in a first circumferential direction, enter the slots 21c at Slot Number 18, extend out rearward from the slots 21c at Slot Number 18, extend over a rear-end end surface of the stator core 21 in the first circumferential direction, enter the slots 21c at Slot Number 23, and thereafter the conductor wire 30 sequentially enters the slots 21c at Slot Numbers 30, 35, 42, 47, 54, 59, 66, 71, and 6, and then mounting the conductor wire 30 into a wave winding such that the conductor wire 30 that projects out rearward from the slots 21c at Slot Number 6 extends over the rear-end end surface of the stator core 21 in the first circumferential direction, enters the slots 21c at Slot Number 12, extends out frontward from the slots 21c at Slot Number 12, extends over the front-end end surface of the stator core 21 in the second circumferential direction, enters the slots 21c at Slot Number 5, and thereafter sequentially enters the slots 21c at Slot Numbers 72, 65, 60, 53, 48, 41, 36, 29, 24, and 17.

The Z phase winding 25 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end Z1 is led out rearward from the slots 21c at Slot Number 11, and a winding finishing end Z2 is led out rearward from the slots 21c at Slot Number 17. This Z phase winding 25 is a two-turn wave winding that is mounted to the stator core 21 so as to alternate repeatedly between a 5π/6 short-pitch winding and a 7π/6 long-pitch winding.

The U phase winding 26 is configured by mounting a conductor wire 30 into a wave winding so as to enter the slots 21c at Slot Number 6 from the rear end, extend out frontward from the slots 21c at Slot Number 6, extend over a front-end end surface of the stator core 21 in a first circumferential direction, enter the slots 21c at Slot Number 13, extend out rearward from the slots 21c at Slot Number 13, extend over a rear-end end surface of the stator core 21 in the first circumferential direction, enter the slots 21c at Slot Number 18, and thereafter the conductor wire 30 sequentially enters the slots 21c at Slot Numbers 25, 30, 37, 42, 49, 54, 61, 66, and 1, and then mounting the conductor wire 30 into a wave winding such that the conductor wire 30 that projects out rearward from the slots 21c at Slot Number 1 extends over the rear-end end surface of the stator core 21 in the first circumferential direction, enters the slots 21c at Slot Number 7, extends out frontward from the slots 21c at Slot Number 7, extends over the front-end end surface of the stator core 21 in the second circumferential direction, enters the slots 21c at Slot Number 72, and thereafter sequentially enters the slots 21c at Slot Numbers 67, 60, 55, 48, 43, 36, 31, 24, 19, and 12.

The U phase winding 26 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end U1 is led out rearward from the slots 21c at Slot Number 6, and a winding finishing end U2 is led out rearward from the slots 21c at Slot Number 12. This U phase winding 26 is a two-turn wave winding that is mounted to the stator core 21 so as to alternate repeatedly between a 5π/6 short-pitch winding and a 7π/6 long-pitch winding.

The V phase winding 27 is configured by mounting a conductor wire 30 into a wave winding so as to enter the slots 21c at Slot Number 8 from the rear end, extend out frontward from the slots 21c at Slot Number 8, extend over a front-end end surface of the stator core 21 in a first circumferential direction, enter the slots 21c at Slot Number 15, extend out rearward from the slots 21c at Slot Number 15, extend over a rear-end end surface of the stator core 21 in the first circumferential direction, enter the slots 21c at Slot Number 20, and thereafter the conductor wire 30 sequentially enters the slots 21c at Slot Numbers 27, 32, 39, 44, 51, 56, 63, 68, and 3, and then mounting the conductor wire 30 into a wave winding such that the conductor wire 30 that projects out rearward from the slots 21c at Slot Number 3 extends over the rear-end end surface of the stator core 21 in the first circumferential direction, enters the slots 21c at Slot Number 9, extends out frontward from the slots 21c at Slot Number 9, extends over the front-end end surface of the stator core 21 in the second circumferential direction, enters the slots 21c at Slot Number 2, and thereafter sequentially enters the slots 21c at Slot Numbers 69, 62, 57, 50, 45, 38, 33, 26, 21, and 14.

The V phase winding 27 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end V1 is led out rearward from the slots 21c at Slot Number 8, and a winding finishing end V2 is led out rearward from the slots 21c at Slot Number 14. This V phase winding 27 is a two-turn wave winding that is mounted to the stator core 21 so as to alternate repeatedly between a $5\pi/6$ short-pitch winding and a $7\pi/6$ long-pitch winding.

The W phase winding 28 is configured by mounting a conductor wire 30 into a wave winding so as to enter the slots 21c at Slot Number 10 from the rear end, extend out frontward from the slots 21c at Slot Number 10, extend over a front-end end surface of the stator core 21 in a first circumferential direction, enter the slots 21c at Slot Number 17, extend out rearward from the slots 21c at Slot Number 17, extend over a rear-end end surface of the stator core 21 in the first circumferential direction, enter the slots 21c at Slot Number 22, and thereafter the conductor wire 30 sequentially enters the slots 21c at Slot Numbers 29, 34, 41, 46, 53, 58, 65, 70, and 5, and then mounting the conductor wire 30 into a wave winding such that the conductor wire 30 that projects out rearward from the slots 21c at Slot Number 5 extends over the rear-end end surface of the stator core 21 in the first circumferential direction, enters the slots 21c at Slot Number 11, extends out frontward from the slots 21c at Slot Number 11, extends over the front-end end surface of the stator core 21 in the second circumferential direction, enters the slots 21c at Slot Number 4, and thereafter sequentially enters the slots 21c at Slot Numbers 71, 64, 59, 52, 47, 40, 35, 28, 23, and 16.

The W phase winding 28 is thereby configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end W1 is led out rearward from the slots 21c at Slot Number 10, and a winding finishing end W2 is led rearward from the slots 21c at Slot Number 16. This W phase winding 28 is a two-turn wave winding that is mounted to the stator core 21 so as to alternate repeatedly between a $5\pi/6$ short-pitch winding and a $7\pi/6$ long-pitch winding.

The six phase windings that have been configured in this manner are mounted into the stator core 21 so as to be offset at a pitch of one slot circumferentially (a pitch corresponding to an electrical angle of $\pi/6$) in order of the U phase winding 26, the X phase winding 23, the V phase winding 27, the Y phase winding 24, the W phase winding 28, and the Z phase winding 25, and so as to line up in that order outward from a radially inner side. Portions of the conductor wires 30 that extend outward from the slots 21c and enter slots 21c that are five slots apart, i.e., crossover portions, are arranged on the rear-end end surface of the stator core 21 to constitute the rear-end coil ends 22r, and portions of the conductor wires 30 that extend outward from the slots 21c and enter slots 21c that are seven slots apart, i.e., crossover portions, are arranged on the front-end end surface of the stator core 21 to constitute the front-end coil ends 22f.

In the rear-end coil ends 22r, as shown in FIG. 4, gaps between circumferentially adjacent crossover portions extend radially outward from a radially inner side to form cooling airflow channels that are inclined forward in a direction of rotation of the rotor 8. Moreover, although not shown, cooling airflow channels that are inclined forward in the direction of rotation of the rotor 8 are also formed in the front-end coil ends 22f.

The six phase windings are wound so as to reverse the winding directions of the wave windings of the conductor wires 30 within a range of Slot Numbers 1 through 12 (equivalent to a pitch of two poles). As shown in FIG. 5, there are five interfering portions among the circumferentially adjacent conductor wires 30 in the rear-end coil ends 22r at a pitch approximately equivalent to one magnetic pole, and there are ten interfering portions among the circumferentially adjacent conductor wires 30 in the front-end coil ends 22f at a pitch approximately equivalent to one magnetic pole.

The stator winding 22 is constituted by: a first three-phase alternating-current winding 100 that is prepared by connecting the winding finishing ends X2, Y2, and Z2 of the X phase winding 23, the Y phase winding 24, and the Z phase winding 25; and a second three-phase alternating-current winding 101 that is prepared by connecting the winding finishing ends U2, V2, and W2 of the U phase winding 26, the V phase winding 27, and the W phase winding 28. The first and second three-phase alternating-current windings 100 and 101 have a phase difference that corresponds to an electrical angle of $\pi/6$ (30 degrees), and as shown in FIG. 3, are respectively connected to separate rectifiers 15. The winding starting ends X1, Y1, Z1, U1, V1, and W1 constitute output wires of the first and second three-phase alternating-current windings 100 and 101.

Thus, respective phase voltages of the X phase winding 23, the Y phase winding 24, the Z phase winding 25, the U phase winding 26, the V phase winding 27, and the W phase winding 28 can theoretically be expressed by Expressions (1) through (6).

$$e_U(t)=2k\sin(5\pi n/12)\sin(n\omega t+\pi/12) \qquad \text{Expression (1)}$$

$$e_V(t)=2k\sin(5\pi n/12)\sin(n\omega t+5\pi/12) \qquad \text{Expression (2)}$$

$$e_W(t)=2k\sin(5\pi n/12)\sin(n\omega t+3\pi/4) \qquad \text{Expression (3)}$$

$$e_X(t)=2k\sin(5\pi n/12)\sin(n\omega t+\pi/4) \qquad \text{Expression (4)}$$

$$e_Y(t)=2k\sin(5\pi n/12)\sin(n\omega t+7\pi/12) \qquad \text{Expression (5)}$$

$$e_Z(t)=2k\sin(5\pi n/12)\sin(n\omega t+11\pi/12) \qquad \text{Expression (6)}$$

Here, $e_U$, $e_V$, and $e_W$ are phase voltages of the first three-phase alternating-current winding 100, $e_X$, $e_Y$, and $e_Z$ are phase voltages of the second three-phase alternating-current winding 101, k is a constant, n is an nth-order harmonic, and $\omega t$ is the electrical angle.

As shown in Expressions (1) through (6), the X phase winding 23, the Y phase winding 24, and the Z phase winding 25 are each given a phase difference that corresponds to an electrical angle of $\pi/3$ (60 degrees), and the U phase winding 26, the V phase winding 27, and the W phase winding 28 are each given a phase difference that corresponds to an electrical angle of $\pi/3$ (60 degrees). In addition, the X phase winding 23, the Y phase winding 24, and the Z phase winding 25 are given a phase difference that corresponds to an electrical angle of $\pi/6$ (30 degrees) relative to the U phase winding 26, the V phase winding 27, and the W phase winding 28.

In an automotive alternator 1 that has been configured in this manner, a field current is supplied from a battery (not shown) through the brushes 13 and the slip rings 12 to the field coil 9, generating magnetic flux. The claw-shaped magnetic poles of the pole core 10 are magnetized by this magnetic flux such that North-seeking (N) poles and South-seeking (S) poles alternate circumferentially.

At the same time, rotational torque from an engine is transferred to the shaft 6 by means of a belt (not shown) and the pulley 7, rotating the rotor 8. Thus, rotating magnetic fields are applied to the stator winding 22 in the stator 20, generating electromotive forces in the first and second three-phase alternating-current windings 100 and 101 in the stator winding 22. The alternating-current electromotive forces that are generated in the first and second three-phase alternating-current windings 100 and 101 are rectified into direct current by the respective rectifiers 15, and magnitudes of output voltages therefrom are adjusted by the voltage regulator 16 and supplied to the battery, and to on-board electrical loads, etc.

The fans 11 are rotated together with the rotor 8. Thus, air is sucked inside the housing 4 through the air intake apertures 2a and 3a, flows axially toward the rotor 8, and is deflected centrifugally by the fans 11. As indicated by arrows A in FIG. 4, the air that has been deflected centrifugally passes through the cooling airflow channels that are inclined forward in the direction of rotation of the rotor 8, crosses the front-end and rear-end coil ends 22f and 22r from a radially inner side to a radially outer side, and is discharged outside the housing 4 through the air discharge apertures 2b and 3b. Heat that is generated in the stator winding 22 is thereby radiated to the air from the front-end and rear-end coil ends 22f and 22r, enabling temperature increases in the stator 20 to be suppressed.

Now, because the X phase winding 23, the Y phase winding 24, and the Z phase winding 25 that constitute the first three-phase alternating-current winding 100 and the U phase winding 26, the V phase winding 27, and the W phase winding 28 that constitute the second three-phase alternating-current winding 101 are mounted into the stator core 21 so as to be offset by an electrical angle of degrees 30 from each other, fifth order harmonic components and seventh order harmonic components, which are predominant among the harmonic components, cancel out, reducing magnetic noise. However, because the U phase winding 26, the X phase winding 23, the V phase winding 27, the Y phase winding 24, the W phase winding 28, and the Z phase winding 25 are arranged in six layers in that order from a radially inner side to a radially outer side, the phase windings that are positioned closer to the radially outer side are less likely to be exposed to the cooling airflows that are blown by the fans 11. Thus, the winding temperature is higher in the radially outer phase windings. The winding resistance in each of the phase windings thereby differs, giving rise to phase voltage differences, and the fifth order harmonic components and the seventh order harmonic components are not canceled out, increasing magnetic noise.

According to Embodiment 1, the U phase winding 26, the X phase winding 23, the V phase winding 27, the Y phase winding 24, the W phase winding 28, and the Z phase winding 25 are each mounted into the stator core 21 so as to alternate repeatedly between a 5π/6 short-pitch winding and a 7π/6 long-pitch winding. From Expression (7), when n=5, β is 0.259, and when n=7, β is 0.259. In other words, in the case of 5π/6 short-pitch windings and 7π/6 long-pitch windings, fifth-order and seventh order harmonic components are 0.259 times those of full-pitch windings, enabling fifth order harmonic components and seventh order harmonic components that are predominant among harmonic components to be reduced. Thus, even if differences in winding resistance arise between each of the phase windings, increases in magnetic noise can be suppressed.

$$\beta=\sin(5\pi n/12) \qquad \text{Expression (7)}$$

According to Embodiment 1, because the U phase winding 26, the X phase winding 23, the V phase winding 27, the Y phase winding 24, the W phase winding 28, and the Z phase winding 25 are mounted into the stator core 21 so as to line up outward from a radially inner side so as to be offset by one slot (an electrical angle of π/6) circumferentially in that order, cooling airflow channels that are inclined forward in the direction of rotation of the rotor 8 are formed on the front-end and rear-end coil ends 22f and 22r. Thus, because cooling airflows due to rotation of the fans 11 flow through the cooling airflow channels and are discharged through the air discharge apertures 2b and 3b, ventilation resistance is reduced, and the quantity of cooling airflow is increased, enabling the stator winding 22 to be cooled effectively and also enabling wind noise to be reduced.

Next, a method for mounting the phase windings will be explained with reference to FIG. 6.

First, a conductor wire 30 is wound for one turn annularly, and is then wound again for one turn annularly. Next, as shown in FIG. 6(a), each of the single-turn annular bodies is bent and shaped into a star shape to prepare two star-shaped units 31 that are linked by the conductor wire 30. Each of the star-shaped units 31 is configured such that first crossover portions 32 that have a length corresponding to five slots and second crossover portions 33 that have a length corresponding to seven slots are divided into two rows on an inner peripheral side and an outer peripheral side, are arranged alternately in a circumferential direction, and are linked by slot-housed portions 35 between end portions of the first crossover portions 32 and end portions of the second crossover portions 33. Moreover, a third crossover portion 34 has a length corresponding to six slots.

Next, the two star-shaped units 31 are placed on top of one another to prepare a star-shaped winding unit 36 that is shown in FIG. 6(b). The star-shaped winding unit 36 is configured such that eleven pairs of first crossover portions 32 (and a third crossover portion 34) and second crossover portions 33 that face each other radially are arranged at an angular pitch of 30 degrees circumferentially.

Next, the star-shaped winding unit 36 is bent and shaped into a cylindrical shape in which the slot-housed portions 35 are arranged in a row circumferentially such that longitudinal directions are oriented in an axial direction. Then, the star-shaped winding unit 36 that has been bent and shaped into a cylindrical shape is mounted into the stator core 21 by inserting the slot-housed portions 35 inside the corresponding slots 21c from an inner peripheral side. Five star-shaped winding units 36 that have bent and shaped into cylindrical shapes are similarly mounted into the stator core 21 sequentially so as to be offset by one slot each circumferentially. Thus, a stator 50 is obtained in which the U phase winding 26, the X phase winding 23, the V phase winding 27, the Y phase winding 24, the W phase winding 28, and the Z phase winding 25 are mounted into the stator core 21 so as to be lined up in six layers radially so as to be offset from each other by one slot circumferentially.

The first crossover portions 32 are arranged on the rear-end end surface of the stator core 21 at a pitch of six slots circumferentially so as to line up in six layers radially to constitute the rear-end coil ends 22r, and the second crossover portions 33 are arranged on the front-end end surface of the stator core 21 at a pitch of six slots circumferentially so as to line up in six layers radially to constitute the front-end coil ends 22f.

Because the six phase windings can be prepared by mounting six identically shaped star-shaped winding units 36 into the stator core 21 so as to be offset by one slot in this manner, winding productivity is increased.

Moreover, in Embodiment 1 above, the phase windings are prepared by installing one star-shaped winding unit in the stator core, but phase windings may also be prepared by mounting a plurality of star-shaped winding units into the stator core so as to be stacked radially. For example, four-turn phase windings can be prepared by mounting two star-shaped winding units into identical slot groups so as to be stacked radially in two layers if the two star-shaped winding units are connected in series by connecting the winding finishing end of the first star-shaped winding unit and the winding starting end of the second star-shaped winding unit. Two-turn phase windings can be prepared if the two star-shaped winding units are connected in parallel by connecting the winding starting end and the winding finishing end of the first star-shaped winding unit and the winding starting end and the winding finishing end of the second star-shaped winding unit.

In Embodiment 1 above, star-shaped winding units that have been configured by stacking together two star-shaped units that have been prepared using a single conductor wire are mounted into the stator core, but two star-shaped units that have each been prepared using a single conductor wire may also be stacked and mounted into the stator core, and the two star-shaped units subsequently connected in series.

Figure 13:
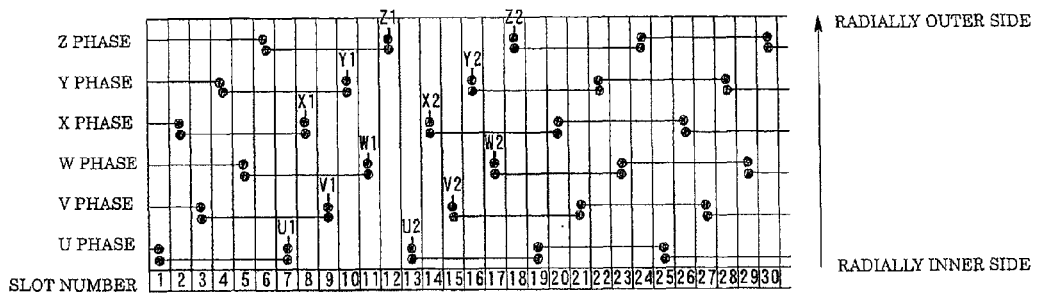
FIG. 13 is a developed projection that explains an installed state of a stator winding in a comparative stator.
Figure 14:
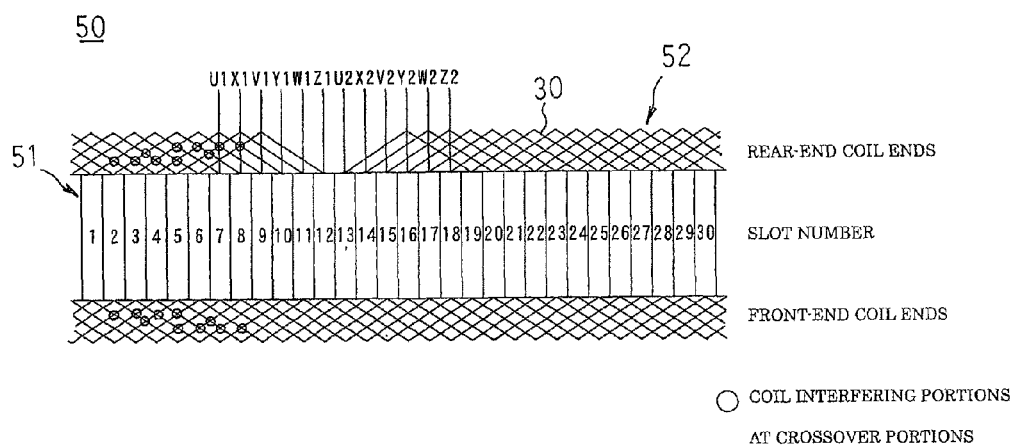
FIG. 14 is a developed projection that explains the installed state of the stator winding in the comparative stator.

Next, in order to explain unique effects due to the winding construction according to Embodiment 1, a winding construction using a full-pitch winding will be explained as a comparative example with reference to FIGS. 13 and 14. FIGS. 13 and 14 are each developed projections that explain an installed state of a stator winding in a comparative stator, FIG. 13 representing as a plan a state when the stator is viewed from axially outside, and FIG. 14 representing as a plan a state when the stator is viewed from radially inside.

As shown in FIGS. 13 and 14, an X phase winding is configured by mounting a conductor wire 30 into a wave winding so as to enter the slots at Slot Number 8 from the rear end, extend out frontward from the slots at Slot Number 8, extend over a front-end end surface of the stator core 51 in a first circumferential direction, enter the slots at Slot Number 14, extend out rearward from the slots at Slot Number 14, extend over a rear-end end surface of the stator core 51 in the first circumferential direction, enter the slots at Slot Number 20, and thereafter the conductor wire 30 sequentially enters the slots at Slot Numbers 26, 32, 38, 44, 50, 56, 62, 68, and 2, and then mounting the conductor wire 30 into a wave winding such that the conductor wire 30 that projects out rearward from the slots at Slot Number 2 extends over the rear-end end surface of the stator core 51 in the first circumferential direction, enters the slots at Slot Number 8, extends out frontward from the slots at Slot Number 8, extends over the front-end end surface of the stator core 51 in the second circumferential direction, enters the slots at Slot Number 2, and thereafter sequentially enters the slots at Slot Numbers 68, 62, 56, 50, 44, 38, 32, 26, 20, and 14.

This X phase winding is configured such that a single conductor wire 30 is wound for two turns into a wave winding so as to sequentially enter slots that are six slots apart, and a winding starting end X1 is led out rearward from the slots at Slot Number 8, and a winding finishing end X2 is led out rearward from the slots at Slot Number 14.

A Y phase winding is similarly configured such that a single conductor wire 30 is wound for two turns into a wave winding so as to sequentially enter slots that are six slots apart, and a winding starting end Y1 is led out rearward from the slots at Slot Number 10, and a winding finishing end Y2 is led out rearward from the slots at Slot Number 16. A Z phase winding is similarly configured such that a single conductor wire 30 is wound for two turns into a wave winding so as to sequentially enter slots that are six slots apart, and a winding starting end Z1 is led out rearward from the slots at Slot Number 12, and a winding finishing end Z2 is led out rearward from the slots at Slot Number 18.

A U phase winding is similarly configured such that a single conductor wire 30 is wound for two turns into a wave winding so as to sequentially enter slots that are six slots apart, and a winding starting end U1 is led out rearward from the slots at Slot Number 7, and a winding finishing end U2 is led out rearward from the slots at Slot Number 13. A V phase winding is similarly configured such that a single conductor wire 30 is wound for two turns into a wave winding so as to sequentially enter slots that are six slots apart, and a winding starting end V1 is led out rearward from the slots at Slot Number 9, and a winding finishing end V2 is led out rearward from the slots at Slot Number 15. A W phase winding is similarly configured such that a single conductor wire 30 is wound for two turns into a wave winding so as to sequentially enter slots that are six slots apart, and a winding starting end W1 is led out rearward from the slots at Slot Number 11, and a winding finishing end W2 is led out rearward from the slots at Slot Number 17.

In the comparative stator 50, the X phase winding, the Y phase winding, the Z phase winding, the U phase winding, the V phase winding, and the W phase winding are two-turn wave windings that are mounted into the stator core 21 in full-pitch windings. The six phase windings that have been configured in this manner are mounted into the stator core 51 so as to be offset at a pitch of one slot circumferentially (a pitch corresponding to an electrical angle of $\pi/6$) in order of the U phase winding, the V phase winding, the W phase winding, the X phase winding, the Y phase winding, and the Z phase winding, and so as to line up in that order outward from a radially inner side. The winding starting ends X1, Y1, Z1, U1, V1, and W1 constitute output wires of first and second three-phase alternating-current windings that constitute a stator winding 52.

The six phase windings are wound so as to reverse the winding directions of the wave windings of the conductor wires 30 within a range of Slot Numbers 1 through 12 (equivalent to a pitch of two poles) from which the output wires are led out. As shown in FIG. 14, there are ten interfering portions among the circumferentially adjacent conductor wires 30 in the rear-end coil ends at a pitch approximately equivalent to one magnetic pole, and there are ten interfering portions among the circumferentially adjacent conductor wires 30 in the front-end coil ends at a pitch approximately equivalent to one magnetic pole.

Thus, because there are more interfering portions in the comparative stator 50, the problems described below arise.

First, the conductor wires 30 rub against each other at the interfering portions due to engine vibration, etc., making the insulating coatings of the conductor wires 30 more likely to be damaged, and increasing the probability of occurrences of short circuiting between the phases.

Because radial expansion is increased in the front-end and rear-end coil ends, increases in body dimensions of automotive alternators arise since it is necessary to ensure insulation distance between the front-end and rear-end coil ends and the front bracket and the rear bracket.

Because radial expansion in the front-end and rear-end coil ends is large, circumferential irregularities in the front-end and rear-end coil ends are increased, increasing wind noise that results from irregularities.

Because the interfering portions among the conductor wires 30 in the rear-end coil ends are positioned in radially central portions of the rear-end coil ends, as shown in FIG. 14, spacing between the interfering portions is narrow, making stress dispersion between the interfering portions difficult, and increasing the occurrence of short circuiting between the phases due to engine vibration.

According to Embodiment 1, on the other hand, the U phase winding 26, the X phase winding 23, the V phase winding 27, the Y phase winding 24, the W phase winding 28, and the Z phase winding 25 are each mounted into the stator core 21 so as to alternate repeatedly between a $5\pi/6$ short-pitch winding and a $7\pi/6$ long-pitch winding. In addition, the U phase winding 26, the X phase winding 23, the V phase winding 27, the Y phase winding 24, the W phase winding 28, and the Z phase winding 25 are mounted into the stator core 21 so as to be offset at a pitch of one slot circumferentially (a pitch corresponding to an electrical angle of $\pi/6$), and so as to line up in that order outward from a radially inner side in that order. Thus, there are five interfering portions among the circumferentially adjacent conductor wires 30 in the rear-end coil ends 22r in particular at a pitch of approximately one magnetic pole, which is half as many as in the full-pitch winding comparative example.

Consequently, because the number of interfering portions between circumferentially adjacent conductor wires 30 in the rear-end coil ends 22r is reduced, the probability of occurrence of short circuiting between the phases is significantly reduced, suppressing occurrences of power generation failure.

Because radial expansion of the rear-end coil ends 22r is reduced, insulating distance between the rear-end coil ends 22r and the rear bracket 3 is ensured, and also the body dimensions of the automotive alternator 1 can be reduced.

Because radial expansion of the rear-end coil ends 22r is reduced, circumferential irregularities in the rear-end coil ends 22r are reduced, enabling wind noise that results from irregularities to be reduced.

Because the interfering portions among the conductor wire 30 in the rear-end coil ends 22r are disposed so as to be offset toward apex portions of the rear-end coil ends 22r, as shown in FIG. 5, relaxation of stresses due to engine vibration is enabled. Because the interfering portions among the conductor wire 30 are disposed approximately uniformly circumferentially, stress dispersion is enabled among the interfering portions, suppressing occurrences of short circuiting between the phases due to engine vibration.

Because the output wires of the stator winding 22 are led out from rear-end coil ends 22r that have reduced radial expansion, radial expansion of the coil ends can be reduced compared to when output wires are lead out from the front-end coil ends 22f.

Embodiment 2

Figure 7:
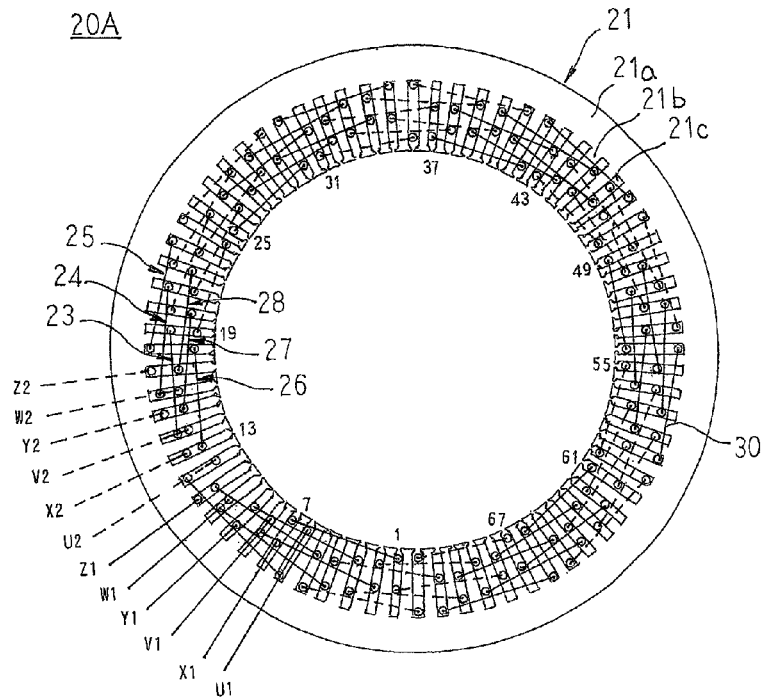
FIG. 7 is a rear-end end elevation that schematically shows an installed state of a stator winding in a stator that can be used in an automotive alternator according to Embodiment 2 of the present invention.
Figure 8:
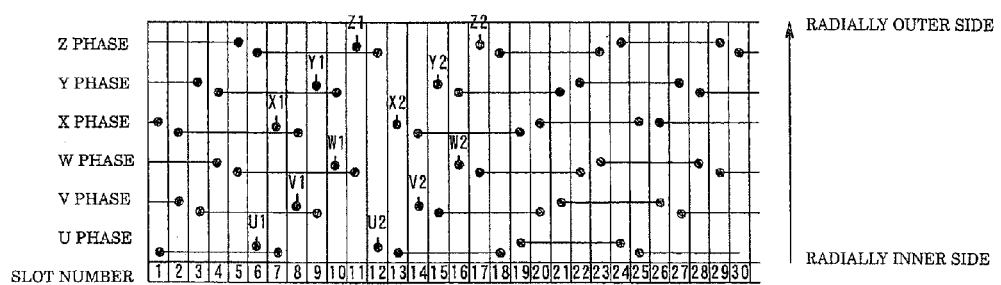
FIG. 8 is a developed projection that explains the installed state of the stator winding in the stator that can be used in the automotive alternator according to Embodiment 2 of the present invention.
Figure 9:
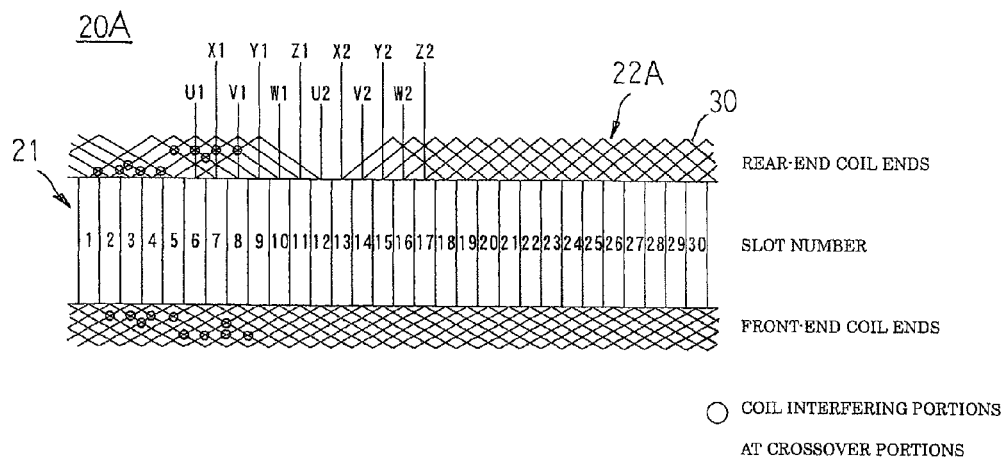
FIG. 9 is a developed projection that explains the installed state of the stator winding in the stator that can be used in the automotive alternator according to Embodiment 2 of the present invention.

FIG. 7 is a rear-end end elevation that schematically shows an installed state of a stator winding in a stator that can be used in an automotive alternator according to Embodiment 2 of the present invention, and FIGS. 8 and 9 are each developed projections that explain the installed state of the stator winding in the stator that can be used in the automotive alternator according to Embodiment 2 of the present invention, FIG. 8 representing as a plan a state when the stator is viewed from axially outside, and FIG. 9 representing as a plan a state when the stator is viewed from radially inside.

In FIGS. 7 through 9, an X phase winding 23, a Y phase winding 24, a Z phase winding 25, a U phase winding 26, a V phase winding 27, and a W phase winding 28 are each mounted into identical slot groups to Embodiment 1 above using an identical winding method.

That is, the X phase winding 23 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end X1 is led out rearward from the slots 21c at Slot Number 7, and a winding finishing end X2 is led out rearward from the slots 21c at Slot Number 13. This X phase winding 23 is a two-turn wave winding that is mounted to the stator core 21 so as to alternate repeatedly between a $5\pi/6$ short-pitch winding and a $7\pi/6$ long-pitch winding.

The Y phase winding 24 is configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end Y1 is led out rearward from the slots 21c at Slot Number 9, and a winding finishing end Y2 is led out rearward from the slots 21c at Slot Number 15. This Y phase winding 24 is a two-turn wave winding that is mounted to the stator core 21 so as to alternate repeatedly between a $5\pi/6$ short-pitch winding and a $7\pi/6$ long-pitch winding.

The Z phase winding 25 is configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end Z1 is led out rearward from the slots 21c at Slot Number 11, and a winding finishing end Z2 is led out rearward from the slots 21c at Slot Number 17. This Z phase winding 25 is a two-turn wave winding that is mounted to the stator core 21 so as to alternate repeatedly between a $5\pi/6$ short-pitch winding and a $7\pi/6$ long-pitch winding.

The U phase winding 26 is configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end U1 is led out rearward from the slots 21c at Slot Number 6, and a winding finishing end U2 is led out rearward from the slots 21c at Slot Number 12. This U phase winding 26 is a two-turn wave winding that is mounted to the stator core 21 so as to alternate repeatedly between a $5\pi/6$ short-pitch winding and a $7\pi/6$ long-pitch winding.

The V phase winding 27 is configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end V1 is led out rearward from the slots 21c at Slot Number 8, and a winding finishing end V2 is led out rearward from the slots 21c at Slot Number 14. This V phase winding 27 is a two-turn wave winding that is mounted to the stator core 21 so as to alternate repeatedly between a 5π/6 short-pitch winding and a 7π/6 long-pitch winding.

The W phase winding 28 is configured such that one conductor wire 30 is wound for one turn in the first circumferential direction into a wave winding so as to alternately enter slots 21c that are five slots apart and slots 21c that are seven slots apart, and is folded back and wound for one turn in the second circumferential direction into a wave winding so as to alternately enter slots 21c that are seven slots apart and slots 21c that are five slots apart. A winding starting end W1 is led out rearward from the slots 21c at Slot Number 10, and a winding finishing end W2 is led rearward from the slots 21c at Slot Number 16. In other words, this W phase winding 28 is a two-turn wave winding that is mounted to the stator core 21 so as to alternate repeatedly between a 5π/6 short-pitch winding and a 7π/6 long-pitch winding.

In Embodiment 2, the six phase windings are mounted into the stator core 21 so as to be offset at a pitch of one slot circumferentially (a pitch corresponding to an electrical angle of π/6) in order of the U phase winding 26, the V phase winding 27, the W phase winding 28, the X phase winding 23, the Y phase winding 24, and the Z phase winding 25, and so as to line up in that order outward from a radially inner side. A stator winding 22A is constituted by: a first three-phase alternating-current winding that is prepared by connecting the winding finishing ends X2, Y2, and Z2 of the X phase winding 23, the Y phase winding 24, and the Z phase winding 25; and a second three-phase alternating-current winding that is prepared by connecting the winding finishing ends U2, V2, and W2 of the U phase winding 26, the V phase winding 27, and the W phase winding 28. The winding starting ends X1, Y1, Z1, U1, V1, and W1 constitute output wires of the first and second three-phase alternating-current windings.

In a stator 20A that has been configured in this manner, because the U phase winding 26, the V phase winding 27, the W phase winding 28, the X phase winding 23, the Y phase winding 24, and the Z phase winding 25 are each mounted into the stator core 21 so as to alternate repeatedly between a 5π/6 short-pitch winding and a 7π/6 long-pitch winding, fifth order harmonic components and seventh order harmonic components that are predominant among harmonic components can be reduced, enabling increases in magnetic noise to be suppressed.

Embodiment 3

Figure 10:
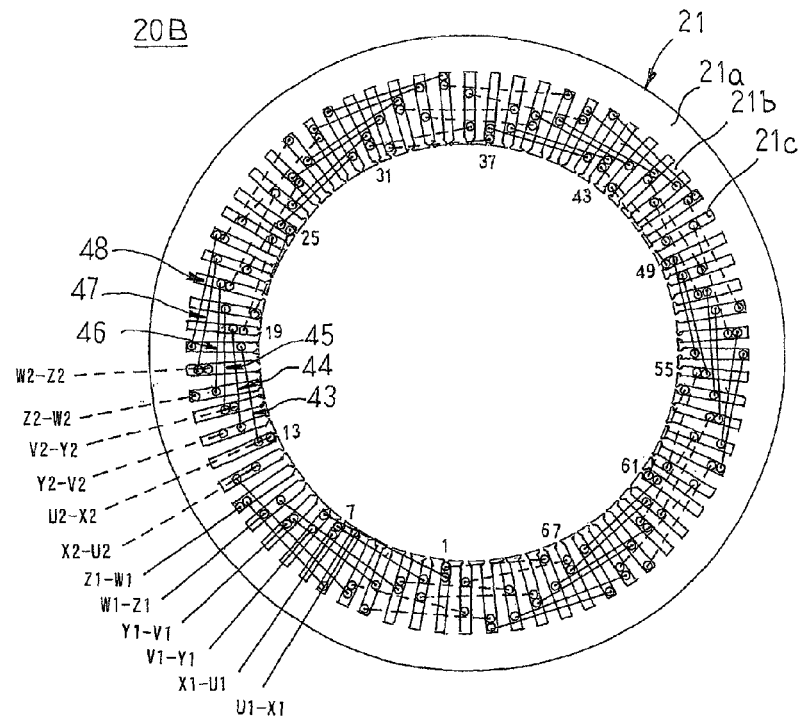
FIG. 10 is a rear-end end elevation that schematically shows an installed state of a stator winding in a stator that can be used in an automotive alternator according to Embodiment 3 of the present invention.
Figure 11:
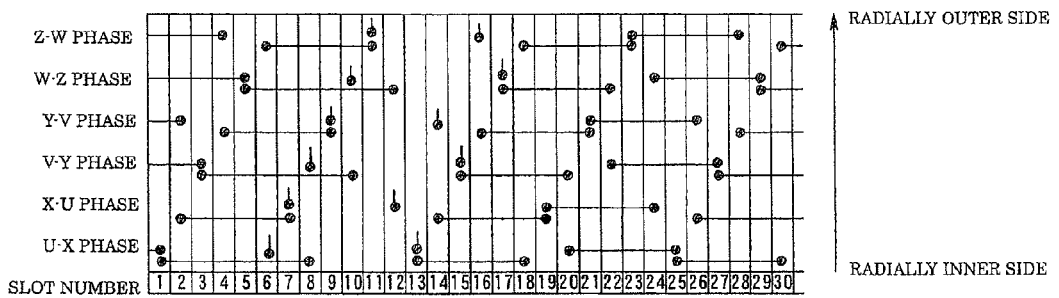
FIG. 11 is a developed projection that explains the installed state of the stator winding in the stator that can be used in the automotive alternator according to Embodiment 3 of the present invention.
Figure 12:
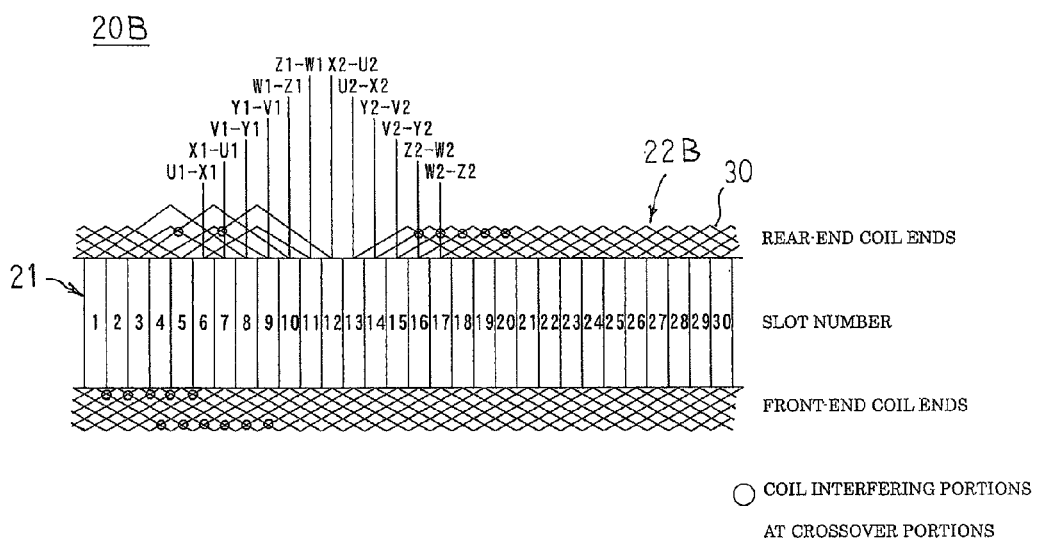
FIG. 12 is a developed projection that explains the installed state of the stator winding in the stator that can be used in the automotive alternator according to Embodiment 3 of the present invention.

FIG. 10 is a rear-end end elevation that schematically shows an installed state of a stator winding in a stator that can be used in an automotive alternator according to Embodiment 3 of the present invention, and FIGS. 11 and 12 are each developed projections that explain the installed state of the stator winding in the stator that can be used in the automotive alternator according to Embodiment 3 of the present invention, FIG. 11 representing as a plan a state when the stator is viewed from axially outside, and FIG. 12 representing as a plan a state when the stator is viewed from radially inside.

In FIGS. 10 through 12, a U-X phase winding 43 is configured by mounting a conductor wire 30 into a wave winding so as to enter the slots 21c at Slot Number 6 from the rear end, extend out frontward from the slots 21c at Slot Number 6, extend over a front-end end surface of the stator core 21 in a first circumferential direction, enter the slots 21c at Slot Number 13, extend out rearward from the slots 21c at Slot Number 13, extend over a rear-end end surface of the stator core 21 in the first circumferential direction, enter the slots 21c at Slot Number 18, and thereafter the conductor wire 30 sequentially enters the slots 21c at Slot Numbers 25, 30, 37, 42, 49, 54, 61, 66, and 1, and then mounting the conductor wire 30 into a wave winding such that the conductor wire 30 that projects out rearward from the slots 21c at Slot Number 1 extends over the rear-end end surface of the stator core 21 in the first circumferential direction, enters the slots 21c at Slot Number 8, extends out frontward from the slots 21c at Slot Number 8, extends over the front-end end surface of the stator core 21 in the second circumferential direction, enters the slots 21c at Slot Number 1, and thereafter sequentially enters the slots 21c at Slot Numbers 68, 61, 56, 49, 44, 37, 32, 25, 20, and 13.

This U-X phase winding 43 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end U1-X1 is led out rearward from the slots 21c at Slot Number 6, and a winding finishing end U2-X2 is led out rearward from the slots 21c at Slot Number 13. This U-X phase winding 43 is a two-turn wave winding that is mounted to the stator core 21 so as to alternate repeatedly between a 5π/6 short-pitch winding and a 7π/6 long-pitch winding.

At a folded-over portion of this U-X phase winding 43, the conductor wire 30 that projects outward at the rear end from the slots 21c at Slot Number 1, extends over the rear-end end surface of the stator core 21 in the first circumferential direction, enters the slots 21c at Slot Number 8, extends outward at the front end from the slots 21c at Slot Number 8, extends over the front-end end surface of the stator core 21 in the second circumferential direction, and enters the slots 21c at Slot Number 1. Thus, the single-turn winding of the U-X phase winding 43 that is wound into a wave winding in the first circumferential direction corresponds to a single-turn winding of a U phase winding 26 that is wound into a wave winding in the first circumferential direction, and the single-turn winding of the U-X phase winding 43 that is wound into a wave winding in the second circumferential direction corresponds to a single-turn winding of an X phase winding 23 that is wound into a wave winding in the second circumferential direction. In other words, the U-X phase winding 43 is a wave winding in which the single-turn winding of the U phase winding 26 and the single-turn winding of the X phase winding 23 are connected (zigzag connected).

An X-U phase winding 44 is configured by mounting a conductor wire 30 into a wave winding so as to enter the slots 21c at Slot Number 7 from the rear end, extend out frontward from the slots 21c at Slot Number 7, extend over a front-end end surface of the stator core 21 in a first circumferential direction, enter the slots 21c at Slot Number 14, extend out rearward from the slots 21c at Slot Number 14, extend over a rear-end end surface of the stator core 21 in the first circumferential direction, enter the slots 21c at Slot Number 19, and thereafter the conductor wire 30 sequentially enters the slots 21c at Slot Numbers 26, 31, 38, 43, 50, 55, 62, 67, and 2, and then mounting the conductor wire 30 into a wave winding such that the conductor wire 30 that projects out rearward from the slots 2k at Slot Number 2 extends over the rear-end end surface of the stator core 21 in the first circumferential direction, enters the slots 21c at Slot Number 7, extends out frontward from the slots 21c at Slot Number 7, extends over the front-end end surface of the stator core 21 in the second circumferential direction, enters the slots 21c at Slot Number 72, and thereafter sequentially enters the slots 21c at Slot Numbers 67, 60, 55, 48, 43, 36, 31, 24, 19, and 12.

This X-U phase winding 44 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end X1-U1 is led out rearward from the slots 21c at Slot Number 7, and a winding finishing end X2-U2 is led out rearward from the slots 21c at Slot Number 12. This X-U phase winding 44 is a two-turn wave winding that is mounted to the stator core 21 so as to alternate repeatedly between a 5π/6 short-pitch winding and a 7π/6 long-pitch winding.

At a folded-over portion of this X-U phase winding 44, the conductor wire 30 that projects outward at the rear end from the slots 21c at Slot Number 2, extends over the rear-end end surface of the stator core 21 in the first circumferential direction, enters the slots 21c at Slot Number 7, extends outward at the front end from the slots 21c at Slot Number 7, extends over the front-end end surface of the stator core 21 in the second circumferential direction, and enters the slots 21c at Slot Number 72. Thus, the single-turn winding of the X-U phase winding 44 that is wound into a wave winding in the first circumferential direction corresponds to a single-turn winding of an X phase winding 23 that is wound into a wave winding in the first circumferential direction, and the single-turn winding of the X-U phase winding 44 that is wound into a wave winding in the second circumferential direction corresponds to a single-turn winding of a U phase winding 26 that is wound into a wave winding in the second circumferential direction. In other words, the X-U phase winding 44 is a wave winding in which the single-turn winding of the X phase winding 23 and the single-turn winding of the U phase winding 26 are connected (zigzag connected).

A V-Y phase winding 45 is configured by mounting a conductor wire 30 into a wave winding so as to enter the slots 21c at Slot Number 8 from the rear end, extend out frontward from the slots 21c at Slot Number 8, extend over a front-end end surface of the stator core 21 in a first circumferential direction, enter the slots 21c at Slot Number 15, extend out rearward from the slots 21c at Slot Number 15, extend over a rear-end end surface of the stator core 21 in the first circumferential direction, enter the slots 21c at Slot Number 20, and thereafter the conductor wire 30 sequentially enters the slots 21c at Slot Numbers 27, 32, 39, 44, 51, 56, 63, 68, and 3, and then mounting the conductor wire 30 into a wave winding such that the conductor wire 30 that projects out rearward from the slots 21c at Slot Number 3 extends over the rear-end end surface of the stator core 21 in the first circumferential direction, enters the slots 21c at Slot Number 10, extends out frontward from the slots 21c at Slot Number 10, extends over the front-end end surface of the stator core 21 in the second circumferential direction, enters the slots 21c at Slot Number 3, and thereafter sequentially enters the slots 21c at Slot Numbers 70, 63, 58, 51, 46, 39, 34, 27, 22, and 15.

This V-Y phase winding 45 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end V1-Y1 is led out rearward from the slots 21c at Slot Number 8, and a winding finishing end V2-Y2 is led out rearward from the slots 21c at Slot Number 15. This V-Y phase winding 45 is a two-turn wave winding that is mounted to the stator core 21 so as to alternate repeatedly between a 5π/6 short-pitch winding and a 7π/6 long-pitch winding.

At a folded-over portion of this V-Y phase winding 45, the conductor wire 30 that projects outward at the rear end from the slots 21c at Slot Number 3, extends over the rear-end end surface of the stator core 21 in the first circumferential direction, enters the slots 21c at Slot Number 10, extends outward at the front end from the slots 21c at Slot Number 10, extends over the front-end end surface of the stator core 21 in the second circumferential direction, and enters the slots 21c at Slot Number 3. Thus, the single-turn winding of the V-Y phase winding 45 that is wound into a wave winding in the first circumferential direction corresponds to a single-turn winding of a V phase winding 27 that is wound into a wave winding in the first circumferential direction, and the single-turn winding of the V-Y phase winding 45 that is wound into a wave winding in the second circumferential direction corresponds to a single-turn winding of a Y phase winding 24 that is wound into a wave winding in the second circumferential direction. In other words, the V-Y phase winding 45 is a wave winding in which the single-turn winding of the V phase winding 27 and the single-turn winding of the Y phase winding 24 are connected (zigzag connected).

A Y-V phase winding 46 is configured by mounting a conductor wire 30 into a wave winding so as to enter the slots 21c at Slot Number 9 from the rear end, extend out frontward from the slots 21c at Slot Number 9, extend over a front-end end surface of the stator core 21 in a first circumferential direction, enter the slots 21c at Slot Number 16, extend out rearward from the slots 21c at Slot Number 16, extend over a rear-end end surface of the stator core 21 in the first circumferential direction, enter the slots 21c at Slot Number 21, and thereafter the conductor wire 30 sequentially enters the slots 21c at Slot Numbers 28, 33, 40, 45, 52, 57, 64, 69, and 4, and then mounting the conductor wire 30 into a wave winding such that the conductor wire 30 that projects out rearward from the slots 21c at Slot Number 4 extends over the rear-end end surface of the stator core 21 in the first circumferential direction, enters the slots 21c at Slot Number 9, extends out frontward from the slots 21c at Slot Number 9, extends over the front-end end surface of the stator core 21 in the second circumferential direction, enters the slots 21c at Slot Number 2, and thereafter sequentially enters the slots 21c at Slot Numbers 69, 62, 57, 50, 45, 38, 33, 26, 21, and 14.

This Y-V phase winding 46 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end Y1-V1 is led out rearward from the slots 21c at Slot Number 9, and a winding finishing end Y2-V2 is led out rearward from the slots 21c at Slot Number 14. This Y-V phase winding 46 is a two-turn wave winding that is mounted to the stator core 21 so as to alternate repeatedly between a 5π/6 short-pitch winding and a 7π/6 long-pitch winding.

At a folded-over portion of this Y-V phase winding 46, the conductor wire 30 that projects outward at the rear end from the slots 21c at Slot Number 4, extends over the rear-end end surface of the stator core 21 in the first circumferential direction, enters the slots 21c at Slot Number 9, extends outward at the front end from the slots 21c at Slot Number 9, extends over the front-end end surface of the stator core 21 in the second circumferential direction, and enters the slots 21c at Slot Number 2. Thus, the single-turn winding of the Y-V phase winding 46 that is wound into a wave winding in the first circumferential direction corresponds to a single-turn winding of a Y phase winding 24 that is wound into a wave winding in the first circumferential direction, and the single-turn winding of the Y-V phase winding 46 that is wound into a wave winding in the second circumferential direction corresponds to a single-turn winding of a V phase winding 27 that is wound into a wave winding in the second circumferential direction. In other words, the Y-V phase winding 46 is a wave winding in which the single-turn winding of the Y phase winding 24 and the single-turn winding of the V phase winding 27 are connected (zigzag connected).

A W-Z phase winding 47 is configured by mounting a conductor wire 30 into a wave winding so as to enter the slots 21c at Slot Number 10 from the rear end, extend out frontward from the slots 21c at Slot Number 10, extend over a front-end end surface of the stator core 21 in a first circumferential direction, enter the slots 21c at Slot Number 17, extend out rearward from the slots 21c at Slot Number 17, extend over a rear-end end surface of the stator core 21 in the first circumferential direction, enter the slots 21c at Slot Number 22, and thereafter the conductor wire 30 sequentially enters the slots 21c at Slot Numbers 29, 34, 41, 46, 53, 58, 65, 70, and 5, and then mounting the conductor wire 30 into a wave winding such that the conductor wire 30 that projects out rearward from the slots 21c at Slot Number 5 extends over the rear-end end surface of the stator core 21 in the first circumferential direction, enters the slots 21c at Slot Number 12, extends out frontward from the slots 21c at Slot Number 12, extends over the front-end end surface of the stator core 21 in the second circumferential direction, enters the slots 21c at Slot Number 5, and thereafter sequentially enters the slots 21c at Slot Numbers 72, 65, 60, 53, 48, 41, 36, 29, 24, and 17.

This W-Z phase winding 47 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end W1-Z1 is led out rearward from the slots 21c at Slot Number 10, and a winding finishing end W2-Z2 is led out rearward from the slots 21c at Slot Number 17. This W-Z phase winding 47 is a two-turn wave winding that is mounted to the stator core 21 so as to alternate repeatedly between a $5\pi/6$ short-pitch winding and a $7\pi/6$ long-pitch winding.

At a folded-over portion of this W-Z phase winding 47, the conductor wire 30 that projects outward at the rear end from the slots 21c at Slot Number 5, extends over the rear-end end surface of the stator core 21 in the first circumferential direction, enters the slots 21c at Slot Number 12, extends outward at the front end from the slots 21c at Slot Number 12, extends over the front-end end surface of the stator core 21 in the second circumferential direction, and enters the slots 21c at Slot Number 5. Thus, the single-turn winding of the W-Z phase winding 47 that is wound into a wave winding in the first circumferential direction corresponds to a single-turn winding of a W phase winding 28 that is wound into a wave winding in the first circumferential direction, and the single-turn winding of the W-Z phase winding 47 that is wound into a wave winding in the second circumferential direction corresponds to a single-turn winding of a Z phase winding 25 that is wound into a wave winding in the second circumferential direction. In other words, the W-Z phase winding 47 is a wave winding in which the single-turn winding of the W phase winding 28 and the single-turn winding of the Z phase winding 25 are connected (zigzag connected).

A Z-W phase winding 48 is configured by mounting a conductor wire 30 into a wave winding so as to enter the slots 21c at Slot Number 11 from the rear end, extend out frontward from the slots 21c at Slot Number 11, extend over a front-end end surface of the stator core 21 in a first circumferential direction, enter the slots 21c at Slot Number 18, extend out rearward from the slots 21c at Slot Number 18, extend over a rear-end end surface of the stator core 21 in the first circumferential direction, enter the slots 21c at Slot Number 23, and thereafter the conductor wire 30 sequentially enters the slots 21c at Slot Numbers 30, 35, 42, 47, 54, 59, 66, 71, and 6, and then mounting the conductor wire 30 into a wave winding such that the conductor wire 30 that projects out rearward from the slots 21c at Slot Number 6 extends over the rear-end end surface of the stator core 21 in the first circumferential direction, enters the slots 21c at Slot Number 11, extends out frontward from the slots 21c at Slot Number 11, extends over the front-end end surface of the stator core 21 in the second circumferential direction, enters the slots 21c at Slot Number 4, and thereafter sequentially enters the slots 21c at Slot Numbers 71, 64, 59, 52, 47, 40, 35, 28, 23, and 16.

This Z-W phase winding 48 is configured such that one conductor wire 30 is wound for one turn in a first circumferential direction into a wave winding so as to alternately enter slots 21c that are five slots apart and slots 21c that are seven slots apart, and is folded back and wound for one turn in a second circumferential direction into a wave winding so as to alternately enter slots 21c that are seven slots apart and slots 21c that are five slots apart. A winding starting end Z1-W1 is led out rearward from the slots 21c at Slot Number 11, and a winding finishing end Z2-W2 is led out rearward from the slots 21c at Slot Number 16. This Z-W phase winding 48 is a two-turn wave winding that is mounted to the stator core 21 so as to alternate repeatedly between a $5\pi/6$ short-pitch winding and a $7\pi/6$ long-pitch winding.

At a folded-over portion of this Z-W phase winding 48, the conductor wire 30 that projects outward at the rear end from the slots 21c at Slot Number 6, extends over the rear-end end surface of the stator core 21 in the first circumferential direction, enters the slots 21c at Slot Number 11, extends outward at the front end from the slots 21c at Slot Number 11, extends over the front-end end surface of the stator core 21 in the second circumferential direction, and enters the slots 21c at Slot Number 4. Thus, the single-turn winding of the Z-W phase winding 48 that is wound into a wave winding in the first circumferential direction corresponds to a single-turn winding of a Z phase winding 25 that is wound into a wave winding in the first circumferential direction, and the single-turn winding of the Z-W phase winding 48 that is wound into a wave winding in the second circumferential direction corresponds to a single-turn winding of a W phase winding 28 that is wound into a wave winding in the second circumferential direction. In other words, the Z-W phase winding 48 is a wave winding in which the single-turn winding of the Z phase winding 25 and the single-turn winding of the W phase winding 28 are connected (zigzag connected).

The six phase windings that have been configured in this manner are mounted into the stator core 21 so as to be offset at a pitch of one slot circumferentially (a pitch corresponding to an electrical angle of $\pi/6$) in order of the U-X phase winding 43, the X-U phase winding 44, the V-Y phase winding 45, the Y-V phase winding 46, the W-Z phase winding 47, and the Z-W phase winding 48, and so as to line up in that order outward from a radially inner side. Portions of the conductor wires 30 that extend outward from the slots 21c and enter slots 21c that are five slots apart, i.e., crossover portions, are arranged on the rear-end end surface of the stator core 21 to constitute rear-end coil ends, and portions of the conductor wires 30 that extend outward from the slots 21c and enter slots 21c that are seven slots apart, i.e., crossover portions, are arranged on the front-end end surface of the stator core 21 to constitute front-end coil ends.

The six phase windings are wound so as to reverse the winding directions of the wave windings of the conductor wires 30 within a range of Slot Numbers 1 through 12 (equivalent to a pitch of two poles). In the folded-over portions in the winding directions of the conductor wires 30, lengths of a portion of the conductor wire 30 that extends out rearward from the slots 21c at Slot Number 1 and enters the slots 21c at Slot Number 8, a portion of the conductor wire 30 that extends out rearward from the slots 21c at Slot Number 3 and enters the slots 21c at Slot Number 10, and a portion of the conductor wire 30 that extends out rearward from the slots 21c at Slot Number 5 and enters the slots 21c at Slot Number 12 are extended, and radial positions of apex portions of crossover portions are raised. Thus, as shown in FIG. 12, there are two interfering portions between circumferentially adjacent conductor wires 30 in the rear-end coil ends at a pitch of approximately one magnetic pole. Moreover, there are five at a pitch approximately equivalent to one magnetic pole in other regions of the rear-end coil ends. There are ten interfering portions between circumferentially adjacent conductor wires 30 in the front-end coil ends at a pitch approximately equivalent to one magnetic pole.

A stator winding 22B is constituted by: a first three-phase alternating-current winding that is prepared by connecting the winding finishing ends X2-U2, Y2-V2, and Z2-W2 of the X-U phase winding 44, the Y-V phase winding 46, and the Z-W phase winding 48; and a second three-phase alternating-current winding that is prepared by connecting the winding finishing ends U2-X2, V2-Y2, and W2-Z2 of the U-X phase winding 43, the V-Y phase winding 45, and the W-Z phase winding 47. The first and second three-phase alternating-current windings have a phase difference that corresponds to an electrical angle of $\pi/6$ (30 degrees), and as shown in FIG. 3, are respectively connected to separate rectifiers 15. The winding starting ends X1-U1, Y1-V1, Z1-W1, U1-X1, V1-Y1, and W1-Z1 constitute output wires of the first and second three-phase alternating-current windings.

According to Embodiment 3, because the U-X phase winding 43, the X-U phase winding 44, the V-Y phase winding 45, the Y-V phase winding 46, the W-Z phase winding 47, and the Z-W phase winding 48 are each mounted into the stator core 21 so as to alternate repeatedly between a $5\pi/6$ short-pitch winding and a $7\pi/6$ long-pitch winding, fifth order harmonic components and seventh order harmonic components that are predominant among harmonic components can be reduced, enabling increases in magnetic noise to be suppressed.

The U-X phase winding 43, the X-U phase winding 44, the V-Y phase winding 45, the Y-V phase winding 46, the W-Z phase winding 47, and the Z-W phase winding 48 are mounted into the stator core 21 so as to be offset at a pitch of one slot circumferentially (a pitch corresponding to an electrical angle of $\pi/6$) in that order, and so as to line up in that order outward from a radially inner side. In addition, the respective phase windings are configured into zigzag-connected wave windings in which the conductor wires 30 of the U-X phase winding 43, the V-Y phase winding 45 and the W-Z phase winding 47 are inserted into slots 21c that are seven slots apart, and the conductor wires 30 of the X-U phase winding 44, the Y-V phase winding 46 and the Z-W phase winding 48 are inserted into slots 21c that are seven slots apart at the rear end of the folded-over portions of the windings. There are two interfering portions between circumferentially adjacent conductor wires 30 in the rear-end coil ends at a pitch of approximately one magnetic pole in the folded-over portions, and there are five at a pitch approximately equivalent to one magnetic pole in other regions.

Consequently, because the number of interfering portions between circumferentially adjacent conductor wires 30 in the rear-end coil ends is reduced, the probability of occurrence of short circuiting between the phases is significantly reduced, suppressing occurrences of power generation failure.

Because radial expansion of the rear-end coil ends is reduced, insulating distance between the rear-end coil ends and a rear bracket is ensured, and body dimensions of an automotive alternator can be reduced.

Because radial expansion of the rear-end coil ends is reduced, circumferential irregularities in the rear-end coil ends are reduced, enabling wind noise that results from irregularities to be reduced.

Because the interfering portions among the conductor wire 30 in the rear-end coil ends are disposed so as to be offset toward apex portions of the rear-end coil ends, as shown in FIG. 12, relaxation of stresses due to engine vibration is possible. Because the interfering portions among the conductor wire 30 are disposed approximately uniformly circumferentially, stress dispersion is enabled among the interfering portions, suppressing occurrences of short circuiting between the phases due to engine vibration.

Because the output wires of the stator winding 22B are led out from rear-end coil ends that have reduced radial expansion, radial expansion of the coil ends can be reduced compared to when output wires are lead out from the front-end coil ends 22f.

Moreover, in each of the above embodiments, explanations are given for automotive alternators, but the present invention is not limited to automotive alternators, and similar effects are also exhibited if the present invention is applied to automotive dynamoelectric machines such as automotive electric motors, automotive generator-motors, etc.

In each of the above embodiments, the output from first and second three-phase alternating-current windings is rectified by separate rectifiers, but first and second three-phase alternating-current windings may also be connected in parallel, and output therefrom rectified by a single rectifier.

What is claimed is:

1. A dynamoelectric machine comprising:
   a rotor that is rotatably supported by a housing; and
   a stator comprising:
      a stator core in which slots are formed at a ratio of two slots per phase per pole; and
      a stator winding that is constituted by six phase windings that are mounted into wave windings in said stator core,
      said stator being supported by said housing so as to surround said rotor,
   wherein:
      said six phase windings are mounted into said stator core so as to be stacked sequentially in a radial direction so as to be offset by one slot each in a first circumferential direction; and
      each of said six phase windings is configured such that a conductor wire is mounted so as to alternate repeatedly between a $5\pi/6$ short-pitch winding and a $7\pi/6$ long-pitch winding.

2. A dynamoelectric machine according to claim 1, wherein each of said six phase windings is constituted by a two-turn wave winding in which said conductor wire is wound for one turn in said first circumferential direction into a wave winding so as to alternate repeatedly between a $5\pi/6$ short-pitch winding and a $7\pi/6$ long-pitch winding, and is then folded back and wound for one turn in a second circumferential direction into a wave winding so as to alternate repeatedly between a $5\pi/6$ short-pitch winding and a $7\pi/6$ long-pitch winding.

3. A dynamoelectric machine according to claim 1, wherein each of said six phase windings is configured by mounting a plurality of two-turn wave windings into said stator core so as to be stacked radially, and connecting said plurality of two-turn wave windings in series or in parallel, said two-turn wave windings being formed such that said conductor wire is wound for one turn in said first circumferential direction into a wave winding so as to alternate repeatedly between a $5\pi/6$ short-pitch winding and a $7\pi/6$ long-pitch winding, and is then folded back and wound for one turn in a second circumferential direction into a wave winding so as to alternate repeatedly between a $5\pi/6$ short-pitch winding and a $7\pi/6$ long-pitch winding.

4. A dynamoelectric machine according to claim 1, wherein said six phase windings are mounted into said stator core such that crossover portions of said $5\pi/6$ short-pitch windings of said conductor wires are arranged in rows on a first axial end surface of said stator core, and crossover portions of said $7\pi/6$ long-pitch windings of said conductor wires are arranged on a second axial end surface of said stator core.

* * * * *